US010458774B2

(12) United States Patent
Veit

(10) Patent No.: US 10,458,774 B2
(45) Date of Patent: Oct. 29, 2019

(54) MULTI-FUNCTION MEASURING GAUGE

(71) Applicant: Veit Tool & Gage, Inc., Davison, MI (US)

(72) Inventor: Duane B. Veit, Davison, MI (US)

(73) Assignee: Veit Tool & Gage, Inc., Davison, MI (US)

( * ) Notice: Subject to any disclaimer, the term of this patent is extended or adjusted under 35 U.S.C. 154(b) by 282 days.

(21) Appl. No.: 15/725,904

(22) Filed: Oct. 5, 2017

(65) Prior Publication Data

US 2018/0106587 A1    Apr. 19, 2018

Related U.S. Application Data

(60) Provisional application No. 62/408,288, filed on Oct. 14, 2016.

(51) Int. Cl.
*G01B 5/20* (2006.01)

(52) U.S. Cl.
CPC .................... *G01B 5/201* (2013.01)

(58) Field of Classification Search
CPC .................... G01B 5/20; G01B 5/201
USPC .................. 33/542, 549–551, 555.1
See application file for complete search history.

(56) References Cited

U.S. PATENT DOCUMENTS

| | | | | |
|---|---|---|---|---|
| 3,911,586 A * | 10/1975 | Malonda | ........... | G01B 5/0002 33/533 |
| 3,988,836 A * | 11/1976 | da Costa | ........... | G01B 7/312 33/550 |
| 4,128,943 A | 12/1978 | Muhlethaler | | |
| 4,586,261 A * | 5/1986 | Beaupere | ........... | G01B 3/002 33/555 |
| 4,679,330 A * | 7/1987 | Williams | ........... | G01B 5/252 33/550 |
| 5,074,051 A * | 12/1991 | Cordy | ........... | G01B 5/14 33/520 |
| 5,176,516 A * | 1/1993 | Koizumi | ........... | A61C 19/04 33/513 |
| 5,287,631 A * | 2/1994 | Stade | ........... | G01B 21/02 33/810 |
| 5,293,695 A * | 3/1994 | Olshefsky | ........... | G01B 5/14 33/501.04 |
| 5,351,410 A * | 10/1994 | Hainneville | ........... | G01B 5/08 33/542 |

(Continued)

FOREIGN PATENT DOCUMENTS

DE    4015576 C2    1/2000

OTHER PUBLICATIONS

Omni Gages, A-G-Davis Teamed for the 21st Century, AA Gage, Author Unknown, Date Unknown, 7 pages.

*Primary Examiner* — Yaritza Guadalupe-McCall
(74) *Attorney, Agent, or Firm* — Brooks Kushman, P.C.

(57) ABSTRACT

According to one aspect of this disclosure a comparative measurement gauge is described. The gauge includes a portable U-shaped body having two arms connected by an intermediate portion, wherein at least one of the arms engages a part to be measured. At least one rod is disposed in a space defined between the two arms. A slide is disposed on the rod in the space and one portion of the slide is attached to a measurement probe. A measurement indicator extends from one of the arms. The measurement indicator includes a tip that is adjacent to the slide. As the slide moves along the rod to measure the part the measurement indicator provides a measurement value.

20 Claims, 18 Drawing Sheets

(56) References Cited

U.S. PATENT DOCUMENTS

| | | | | |
|---|---|---|---|---|
| 5,848,479 A * | 12/1998 | MacIndoe | G01B 3/46 | 33/542 |
| 6,088,925 A * | 7/2000 | Montgomery | G01B 5/14 | 33/522 |
| 6,263,585 B1 * | 7/2001 | Dickinson | G01B 3/20 | 33/542 |
| 6,434,850 B1 * | 8/2002 | Eiden | G01B 5/241 | 33/531 |
| 6,698,105 B2 * | 3/2004 | Shen | G01B 3/28 | 33/531 |
| 6,868,618 B2 * | 3/2005 | Navarro | G01B 3/48 | 33/199 R |
| 7,069,666 B2 * | 7/2006 | Navarro | B23Q 17/22 | 33/626 |
| 7,347,002 B2 * | 3/2008 | Foege | F41A 31/02 | 33/542 |
| 8,584,372 B2 * | 11/2013 | Stoffel | G01B 5/25 | 33/628 |
| 2001/0029677 A1 * | 10/2001 | Bidwell | G01B 5/0004 | 33/542 |
| 2007/0240324 A1 * | 10/2007 | Weier | G01B 13/10 | 33/701 |
| 2018/0106587 A1 * | 4/2018 | Veit | G01B 5/201 | |

* cited by examiner

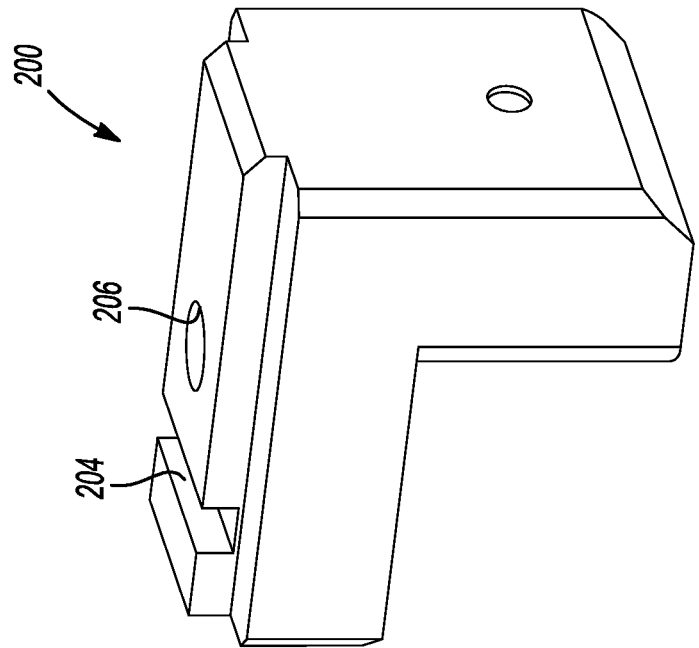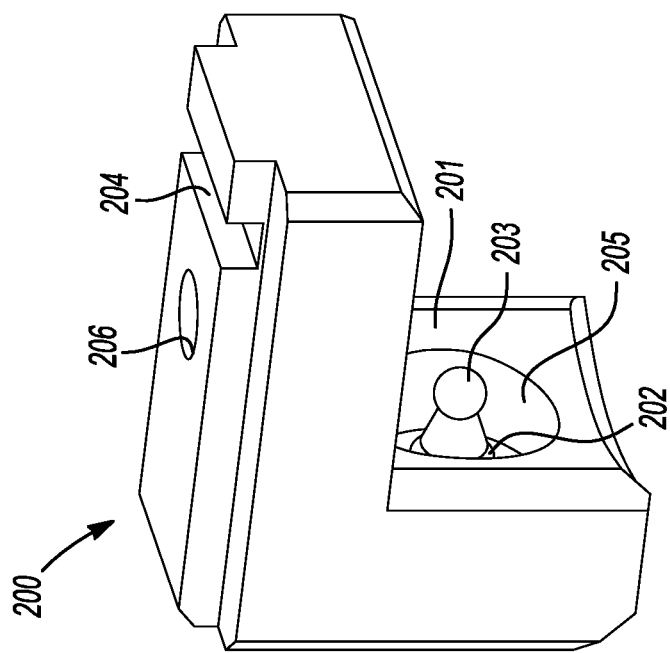
Fig-10

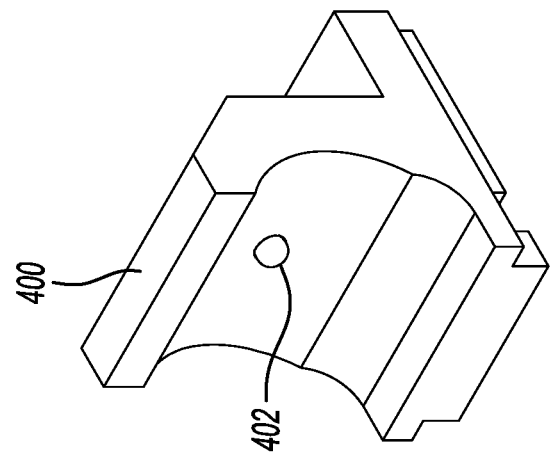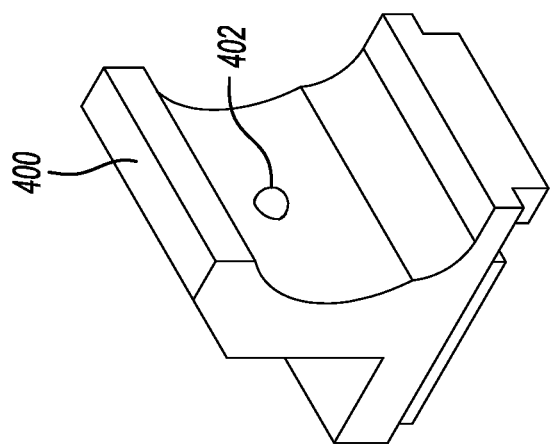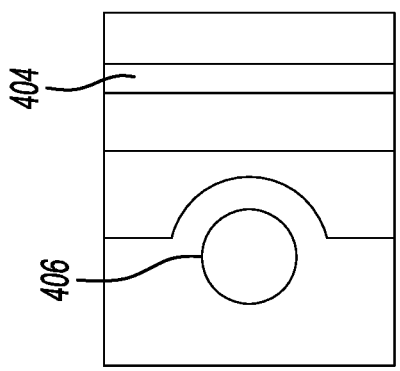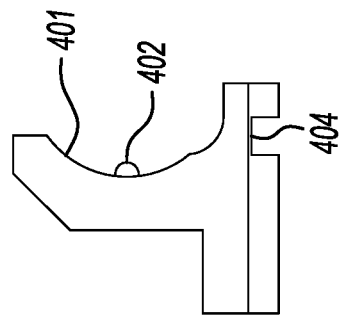
Fig-12

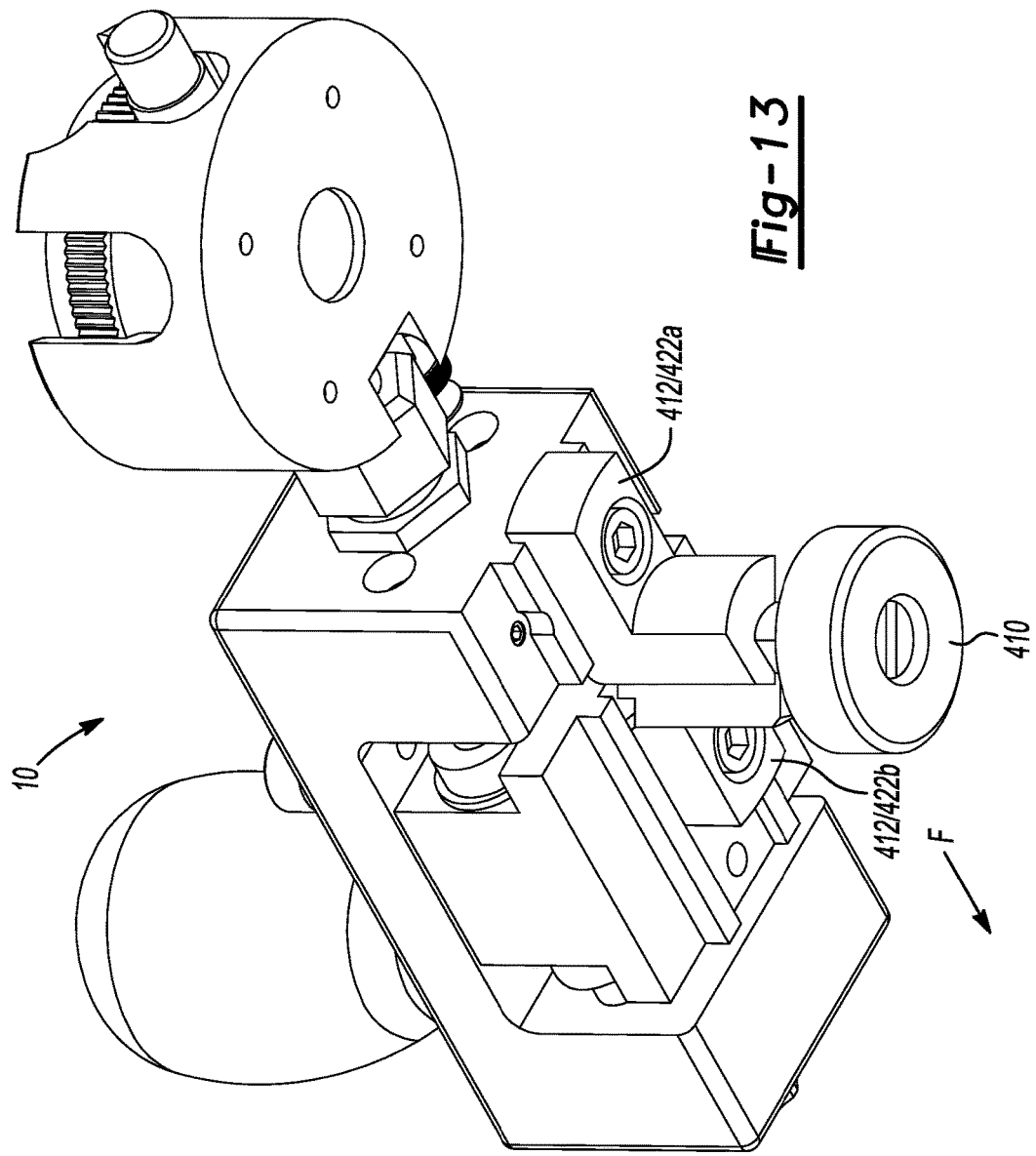

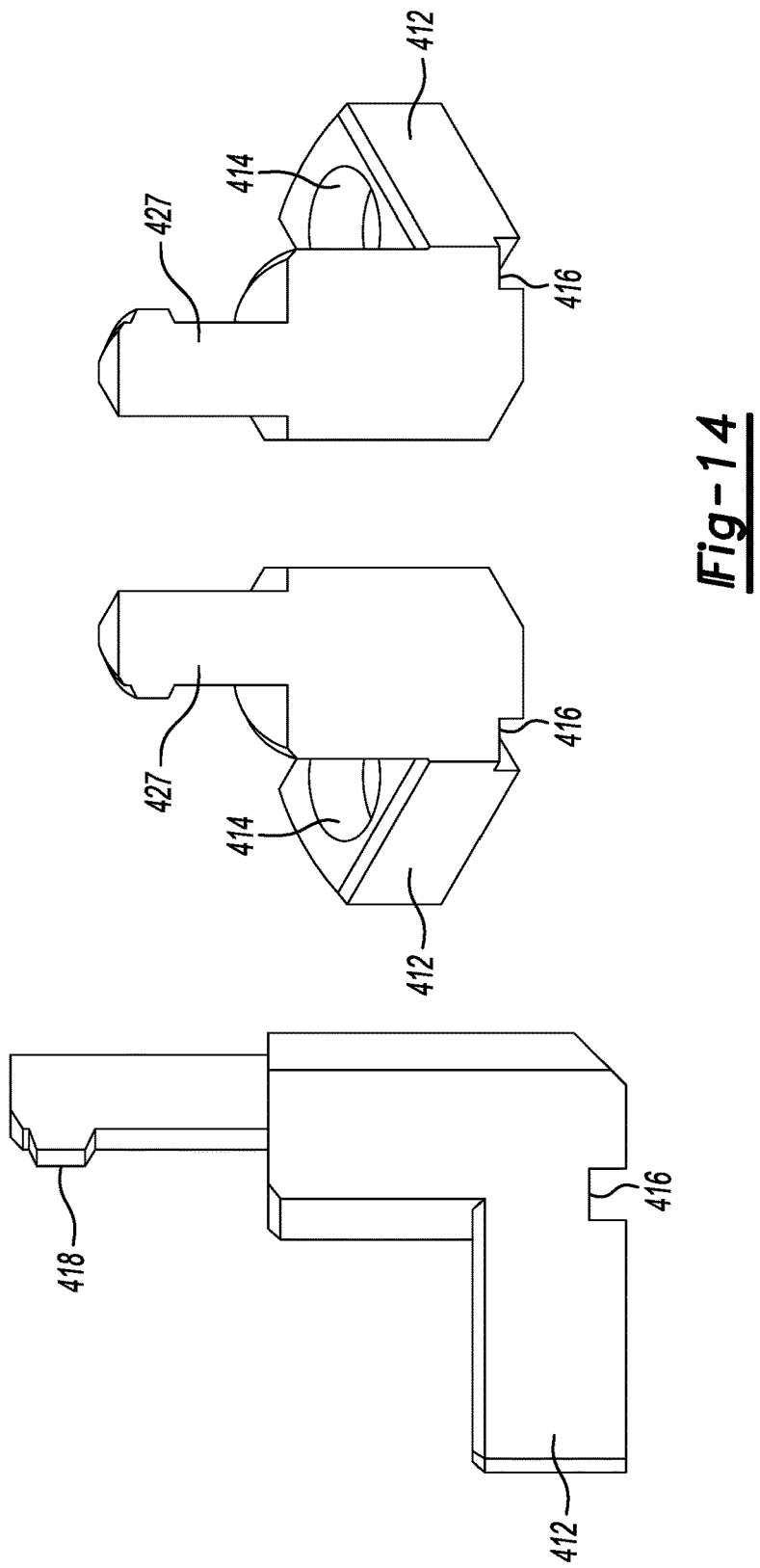

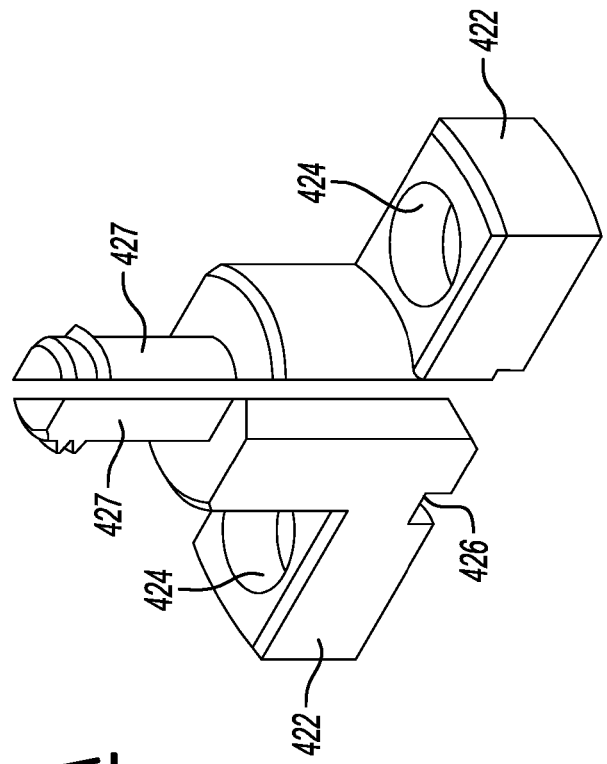
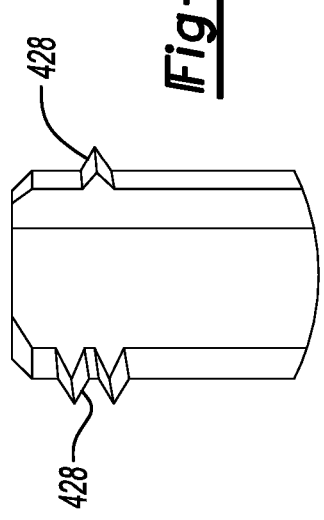
Fig-15A
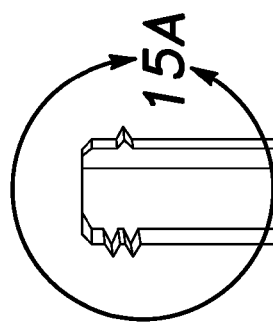
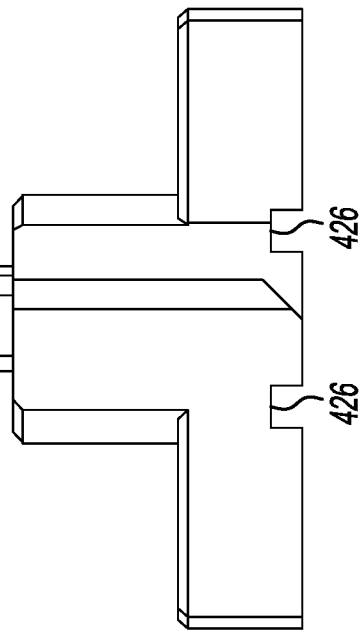
Fig-15

MULTI-FUNCTION MEASURING GAUGE

CROSS-REFERENCE TO RELATED APPLICATIONS

This application claims the benefit of U.S. provisional application Ser. No. 62/408,288 filed Oct. 14, 2016, the disclosure of which is hereby incorporated in its entirety by reference herein.

TECHNICAL FIELD

This disclosure relates to comparative measurement gauges used to measure a difference of physical size between two work pieces or one work piece and a known master, work piece or other sample reference.

BACKGROUND

Gauges are used to measure and display physical quantities of various objects. A comparative gauge is used to measure the difference between a "master" or a known sample versus various other parts or samples. Measurement gauges are often specifically designed for the part or parts they are intended to measure. Because some gauges are only capable of measuring a single part or component, multiple gauges are often required. Having to purchase and store multiple gauges results in higher costs, a larger storage area and it can require training for operators to learn how to operate each gauge. Some gauges are often rather large in size and awkward to hold and use. In many instances, ergonomic constraints require a user to bring the part to the gauge, as opposed to having the user bring the gauge to the part.

This disclosure aims at solving the problems mentioned above.

SUMMARY

According to one aspect of this disclosure a multi-function gauge is described. The gauge includes a U-shaped body having first and second arms connected by an intermediate portion. A fixed measurement probe may be attached to one of the arms. The gauge may include a slide disposed between the two arms and supported on a guide rail for movement between the two arms. The movable measurement probe may be connected to the slide. A spring may operatively engage the slide to bias the slide in one direction relative to the fixed measurement probe. A linear displacement gauge may be mechanically connected to the movable measurement probe to measure the distance between the fixed and movable measurement probes. The linear displacement gauge may be attached to the intermediate portion in a first mode and in a second mode the linear displacement gauge is attached to one of the arms and operatively engage the slide.

According to another aspect of this disclosure, a gauge is described. The gauge includes a U-shaped body having first and second arms connected by an intermediate portion. A fixed measurement probe may be attached to one of the arms. The gauge may include a slide disposed between the two arms and supported on a guide rail for movement between the two arms. The movable measurement probe may be connected to the slide. A spring may operatively engage the slide to bias the slide in one direction relative to the fixed measurement probe. A linear displacement gauge may be mechanically connected to the movable measurement probe to measure the distance between the fixed and movable measurement probes.

According to yet another aspect of this disclosure, a multi-function gauge is described. The gauge includes a U-shaped by having first and second connected by an intermediate portion. The gauge may include a slide disposed between the two arms, supported on a guide rail for movement between the two arms and adapted to receive a movable measurement probe. A linear displacement gauge may be detachably connected to the U-shaped body and mechanically connected to the slide. The linear displacement gauge may be attached to the intermediate portion in a first mode and include a tip that engages an elongated trigger that extends form the slide through a slot defined by the intermediate portion of the body. In a second mode, the linear displacement gauge may be attached to the first arm to operatively engage the slide as the slide moves in a first direction, and in a third mode. In a third mode, the linear displacement gauge may be attached to the second arm to operatively engage the slide as the slide moves in a second direction.

The gauges as generally described above may each include one or more of the following additional aspects.

The guide rail may include at least one rod disposed in a space defined between the first and second arms.

The gauge may include a handle outwardly extending from the U-shaped body and spaced apart from the trigger so that a user may grasp the handle to hold the gauge and actuate the trigger with one hand.

The gauge may also include a mounting bracket that may be attached to the intermediate portion of the U-shaped body in either a first position or second position to facilitate the orientation of the linear displacement gauge.

The gauge may include a general purpose computer configured to communicate with the linear displacement gauge to record the measurement.

The gauge may include a first and second travel limit stop. The travel limit stop is an elongated member extending from at least one of the two arms that extends into the space. The travel limit stop may be configured to stop the slide to prevent either over traveling or under traveling of the linear displacement gauge.

The comparative measurement gauge may include an adjustable set screw and a spring that is coaxial with the set screw. The adjustable set screw may be disposed within a threaded hole defined by one of the two arms. The spring may bias the slide away from one of the arms.

The spring may apply a clamp force on a part positioned between the movable measurement probe and the fixed measurement probe that is equal to or greater than the weight of the gauge so that the gauge may hang from the part.

The comparative measurement gauge may include at least one bearing disposed between the slide and the rod wherein the at least one bearing facilitates displacement of the slide along the rod.

Measurement probes may include a transverse member defining an attachment hole and a locating channel and a semi-circular vertical member having a concave inner surface. A sphere may be located on the concave inner surface. The transverse member may be configured to be attached to the arms and the slide. The concave inner surface of the semi-circular vertical member may be adapted to engage an outside diameter of a worm gear, and the sphere may be adapted to engage either the root or pitch diameter of the worm gear.

Two measurement probes may be provided that cooperate to measure a feature. Each of the measurement probes may include a shank. Either the first or second measurement probe may include at least two protrusions adapted to engage at least two root sections of a threaded part. Either the first or second measurement probe may include one protrusion to engage one root section of a threaded part.

The measurement probe may include a shank extending from the transverse member, wherein the shank includes a protrusion adapted to engage an inner surface of an aperture defined by a part.

The measurement probe may be an elongated member having a proximal end and a distal end. The proximal end may define an attachment hole and locating channel adapted to attach to either the slide or one of the arms. The distal end includes a rounded surface configured to engage an inner surface of an aperture within a part. The second measurement probe may include two elongated members each having a proximal and distal end. The proximal end defines an attachment hole and locating channel adapted to attach to either the slide or one of the arms. The distal end may include a rounded surface configured to engage an inner surface of a bore within a part.

The comparative measurement gauge may include a base member having a planar shape adapted to be placed on a working surface. A base arm having a proximal end may pivotally attach to the base member. The distal end may define an attachment hole. A handle may include a fastener configured to engage a threaded hole defined by the U-shaped body. The gauge may be mounted to the distal end of the base arm.

The measurement probe may be an elongated member having a proximal end and a distal end. The proximal end may define an attachment hole and locating channel adapted to attach to either the slide or one of the arms. The distal end includes a rounded surface configured to engage an inner surface of an aperture within a part. The second measurement probe may include two elongated members each having a proximal and distal end. The proximal end defines an attachment hole and locating channel adapted to attach to either the slide or one of the arms. The distal end may include a rounded surface configured to engage an inner surface of a bore within a part.

The gauge described has the capability to measure various features such as but not limited to: inner diameter, outer diameter, major diameter, inner diameter, and the pitch diameter of a worm gear, spur gear, pinion, helical gears, major and minor diameters of threads, inner bore diameter, 'O' rings, and chamfers. The gauge may utilize different measurement probes designed specifically for the feature being measured. The measurement probes are fastened to the body and the slide of the gauge. By fastening the measurement probes to the slide, or body, or both, they are easily interchangeable to measure varying features. The gauge utilizes a spring to bias the slide within the U-shaped body to measure the desired feature. The gauge may be configured so the slide is biased in either one or two directions. This versatility allows for bi-directional measurements, e.g. biasing the measurement probe away from another or moving a measurement probe towards the other. As one example, if the feature is the outer diameter of a part, the spring biases the slide by compressing or applying pressure to the outer ends of the part. If the feature to be measured of the part is the inner diameter, the slide is biased away from the fixed measurement probe.

BRIEF DESCRIPTION OF THE DRAWINGS

FIG. 2-A is a cross sectional view of the comparative measurement gauge according to the first aspect of this disclosure.

FIG. 10 is a perspective view of the measurement probes adapted to measure external gears.

FIG. 12 is a perspective view of the measurement probes adapted to measure worm gears.

FIG. 13 is a perspective view of the comparative measurement gauge measuring an internal thread or diameter.

FIG. 14 is a perspective view of the measurement probes adapted to measure an inner diameter of a part.

FIG. 15 is a perspective view of the measurement probes adapted to measure an inner thread of a part.

FIG. 15-A is a detailed view of the thread engaging protrusions.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

It should be understood that within the industry, the word gauge may have another spelling, e.g., "gage." For the purposes of this disclosure "gauge" is equivalent to "gage" in that both refer to a device used in measuring, to take measurements, record measurements, and comparing a dimension of an unmeasured sample of work piece to another, known dimension of a measured sample, work piece, or master.

In the following discussion of the figures, a polar coordinate system is utilized. A longitudinal direction extends through the U-shaped body and the measurement indicator. A transverse direction extends across the U-shaped body and is perpendicular to the longitudinal direction.

Figure 1:
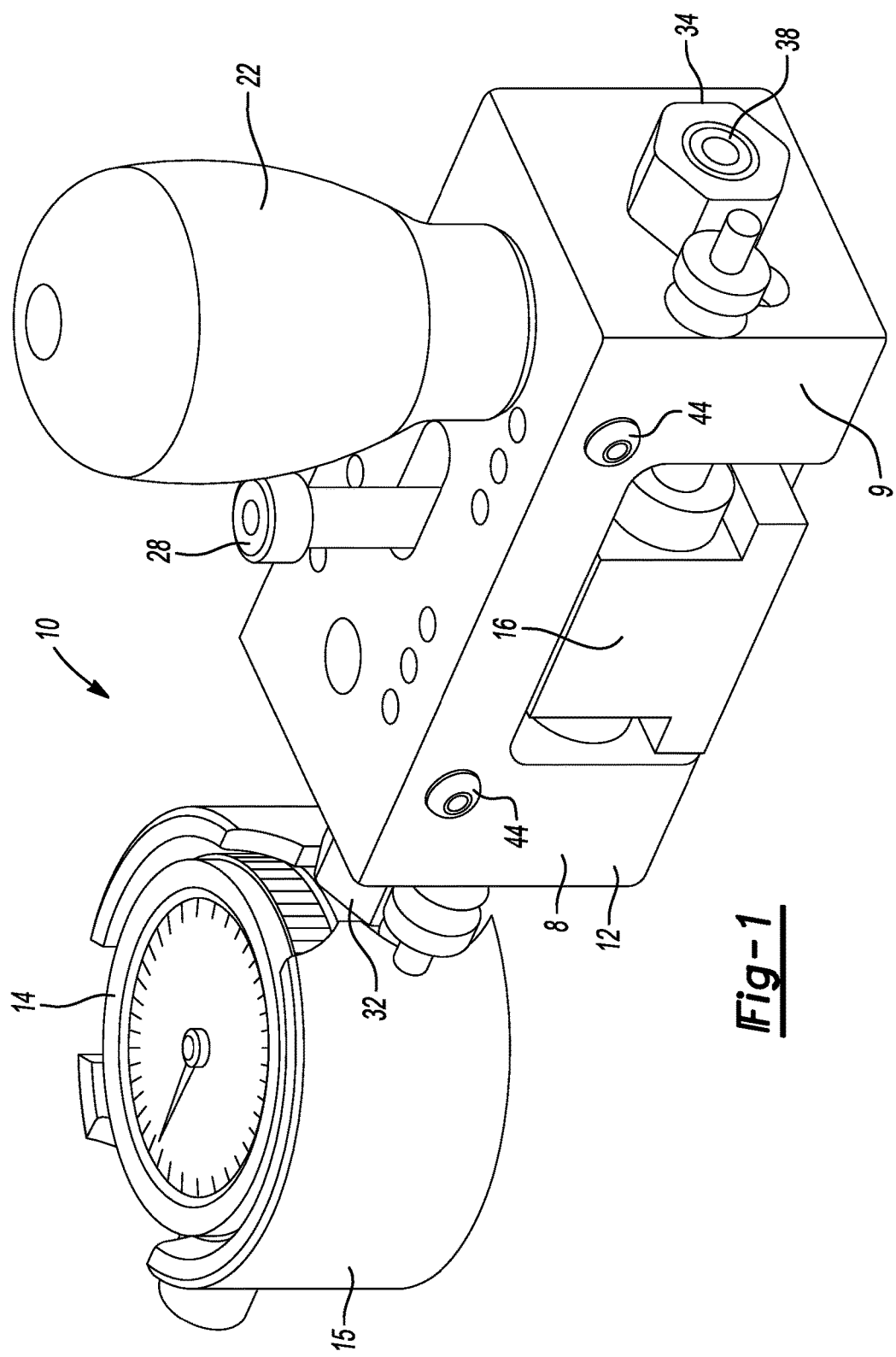
FIG. 1 is a perspective view of the comparative measurement gauge according to the first aspect of this disclosure.
Figure 6:
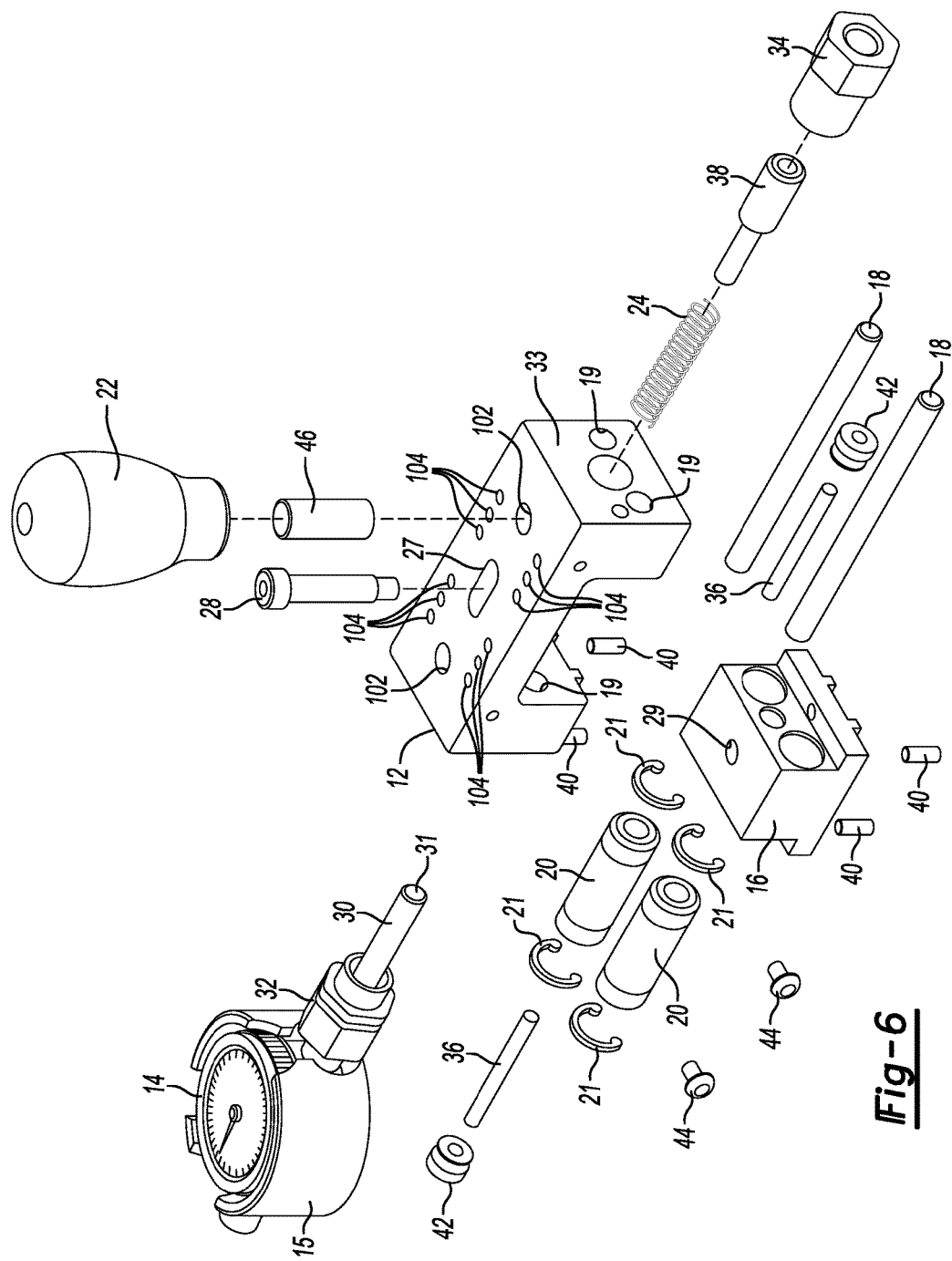
FIG. 6 is an exploded view of the comparative measurement gauge according to the first aspect of this disclosure.
Figure 7:
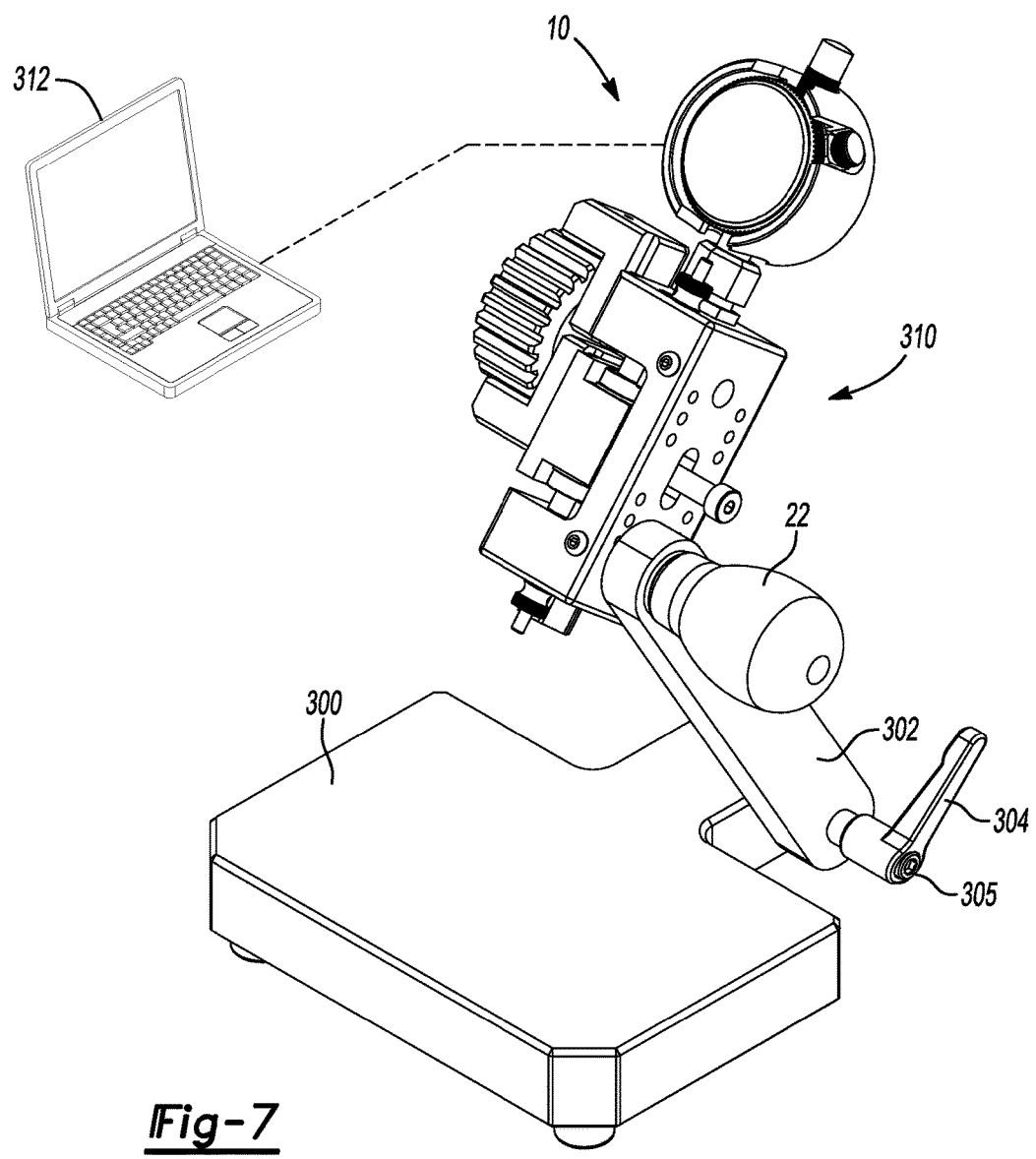
FIG. 7 is a perspective view of the comparative measurement gauge attached to a base assembly and a computer.

Referring to FIG. 1, a front-left perspective view of a comparative measurement gauge 10 is illustrated. The gauge that has a linear displacement gauge 14 attached to a U-shaped body 12 via the collet 32. The linear displacement gauge 14 may also be referred to as a measurement indicator, scale or dial indicator. The U-shaped body 12 has a first arm 8 and a second arm 9. The arms define a space within the intermediate portion of the U-shaped body 12. A slide 16 may be disposed within the space of the intermediate portion. The linear displacement gauge 14 may be an analog dial indicator as illustrated or it may be a digital or electronic measurement indicator, such as a linear variable differential transducer (LVDT). For example, the measurement indicator may be a Starrett® 81-211J indicator, having a measurement resolution to 0.0001 inch. In another aspect embodiment, the linear displacement gauge 14 may be a Mahr Federal® type 1086Ri electronic indicator with wireless data transfer. A LVDT is a common type of electromechanical transducer that can convert rectilinear motion relative to an object to which it is mechanically coupled into a corresponding electrical signal. An indicator shroud 15 may be attached to the linear displacement gauge 14 and acts as a protective cover for the linear displacement gauge 14. The collet 32 may have internal threads that engage external threads disposed on the linear displacement gauge 14. The collet 32 may also be connected by a force fit or snap fit arrangement. A handle 22 may be attached to the U-shaped body 12 by a handle screw 46 (FIG. 6). The handle 22 may be spaced apart from a trigger 28, that extends from the slide 16, so that a user can grasp the handle 22 and actuate the trigger with one hand. As will be described in greater detail below, the handle 22 may attach to a base arm 302 attached to a base 300 (FIG. 7). A slide 16 is disposed within the space defined by the U-shaped body 12. Cap screws 44 are fastened to at least one side of the U-shaped body 12, for attaching a tooling or asset tag.

Figure 2:
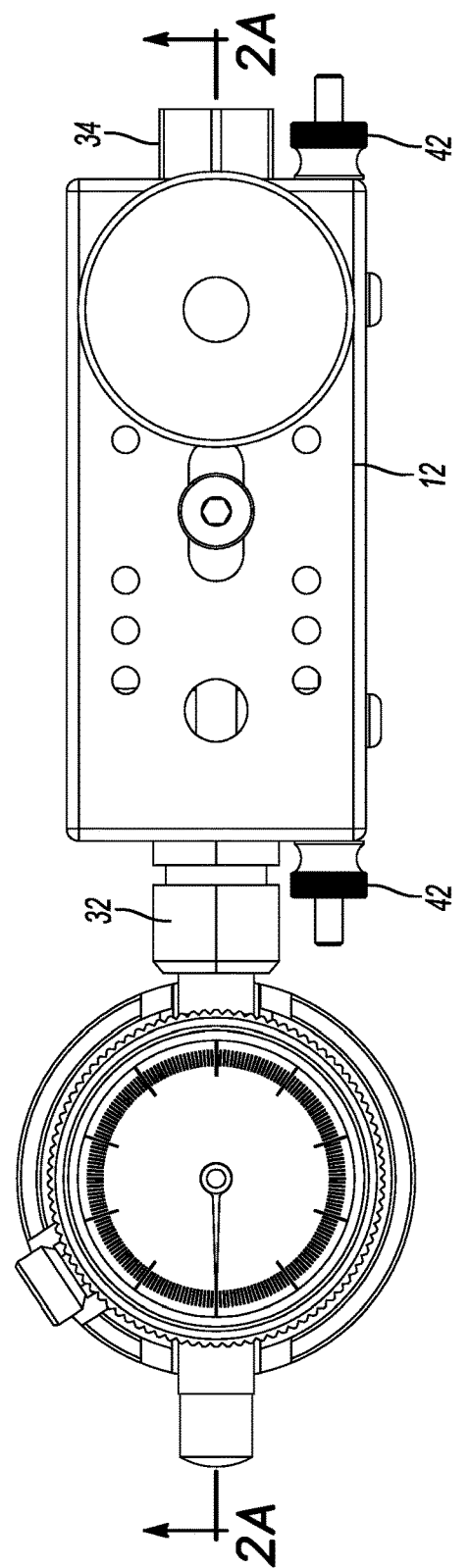
FIG. 2 is a top view of the comparative measurement gauge according to the first aspect of this disclosure.
Figure 2A:
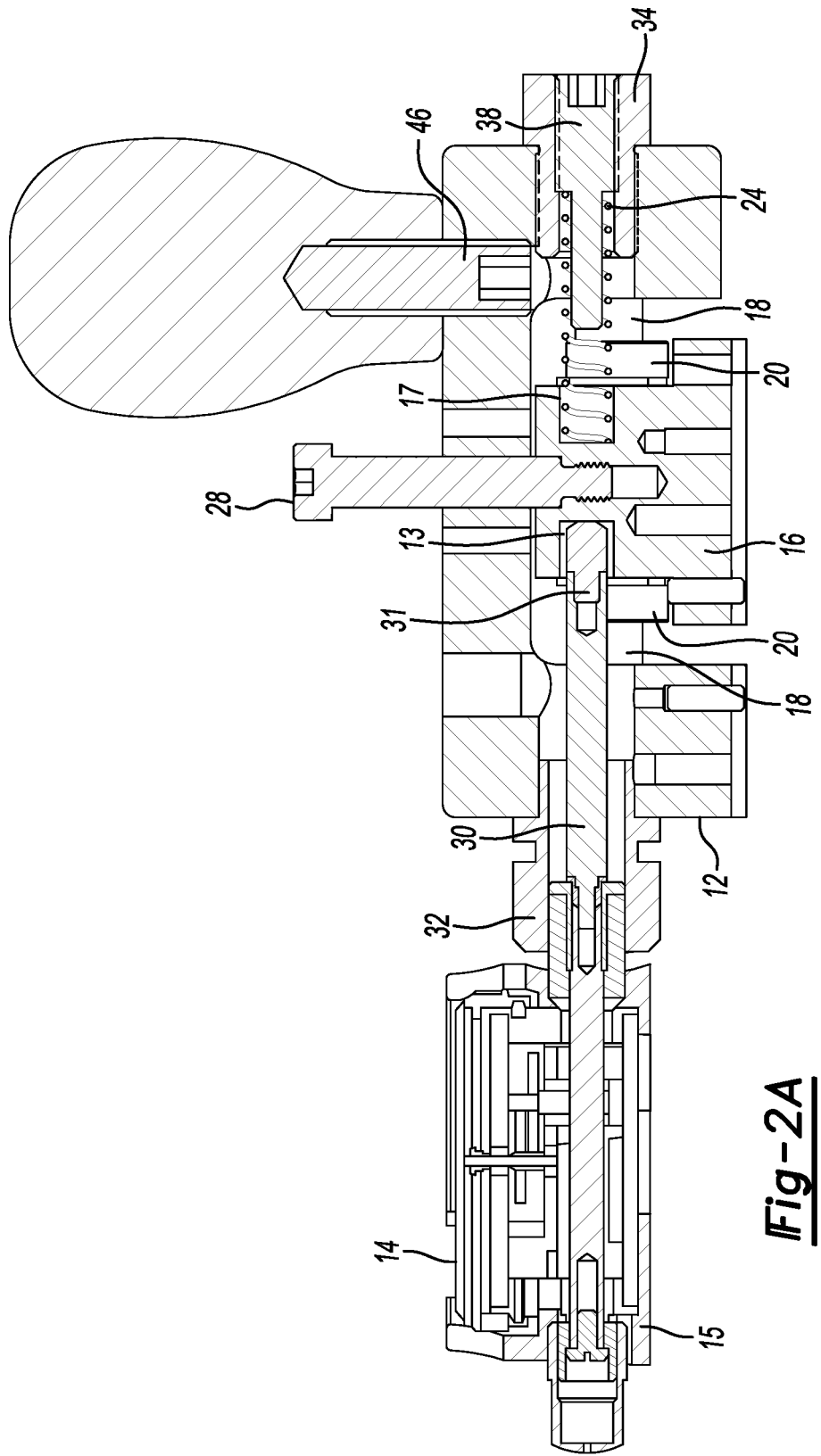

Referring to FIG. 2, a top view of the comparative measurement gauge 10 is illustrated. Thumb nuts 42 may be attached to two travel limit stops 36 (FIG. 3) that are positioned on each end of the U-shaped body 12. The travel limit stops 36 are adjustable to be extended and retracted within the intermediate space of the U-shaped body 12. The thumb nuts 42 may be rotated along threads of the travel limit stop 36. When the thumb nuts 42 contact the U-shaped body 12, the travel limit stop 36 is in a fixed position. A stop sleeve 34 is shown attached to the second arm 9 of the U-shaped body 12. The stop sleeve 34 may be moved to the second arm 8 and the indicator may be moved to the second arm 9.

Referring to FIG. 2-A, a cross sectional view of the gauge 10 taken along the section line A-A in FIG. 2 is illustrated. An indicator tip extension 30 extends from the linear displacement gauge 14 and is connected to the indicator tip 31. The indicator tip 31 is disposed within an indicator tip pocket 13 defined by the slide 16 such that the tip is adjacent to and engages the slide 16. The pocket is not necessarily required, but the pocket facilitates maintaining alignment of the linear displacement gauge 14 and the slide 16. The trigger 28 is attached to the slide 16 and allows for a user to apply force to translate the slide along a guide rail 18. The guide rail 18 may include one or more rods 18, each fixed to the first and second arms. The rods are equally spaced apart from a bottom portion of the first and second arms. Bearings 20 are shown disposed between the slide 16 and the rods 18. The bearings 20 may take several forms including, but not limited to, circuit bearings, ball bearings, roller bearings, needle bearings and the like.

A spring 24 is positioned within the U-shaped body 12 and biases the slide 16 by engaging the spring pocket 17 defined by the slide 16. The pocket is not necessarily required, but the pocket assists in maintaining alignment of the spring within the slide. As the slide 16 translates along the guide rail or rods 18, the measurement indicator tip and extension translate with the slide 16 and provide a measurement value. The stop sleeve 34, a spring adjustment fastener 38 and the spring 24 control the biasing force against the slide 16. The stop sleeve 34 may include a hex nut attached to a shank with a hollow body having an external thread. While a hex nut is currently shown, it should be appreciated that the stop sleeve 34 could include other fasteners having external features such as a knurled finish surface, a keyed configuration, among others. The external threads of the stop sleeve 34 thread into a rod hole 19 of the U-shaped body 12. Dowel pins 40 act as a two-way alignment aid used when attaching measurement probes (not shown). The dowel pins 40 preferably stand proud of the bottom portion of the U-shaped body 12 and the slide 16. The measurement probes may include a recess or pocket slightly larger than the diameter of the dowel pins 40. When placing the measurement probe on the dowel pin 40, the threaded hole on the U-shaped body 12 and/or the slide 16 are in line with the fastening holes for the tools.

Figure 3:
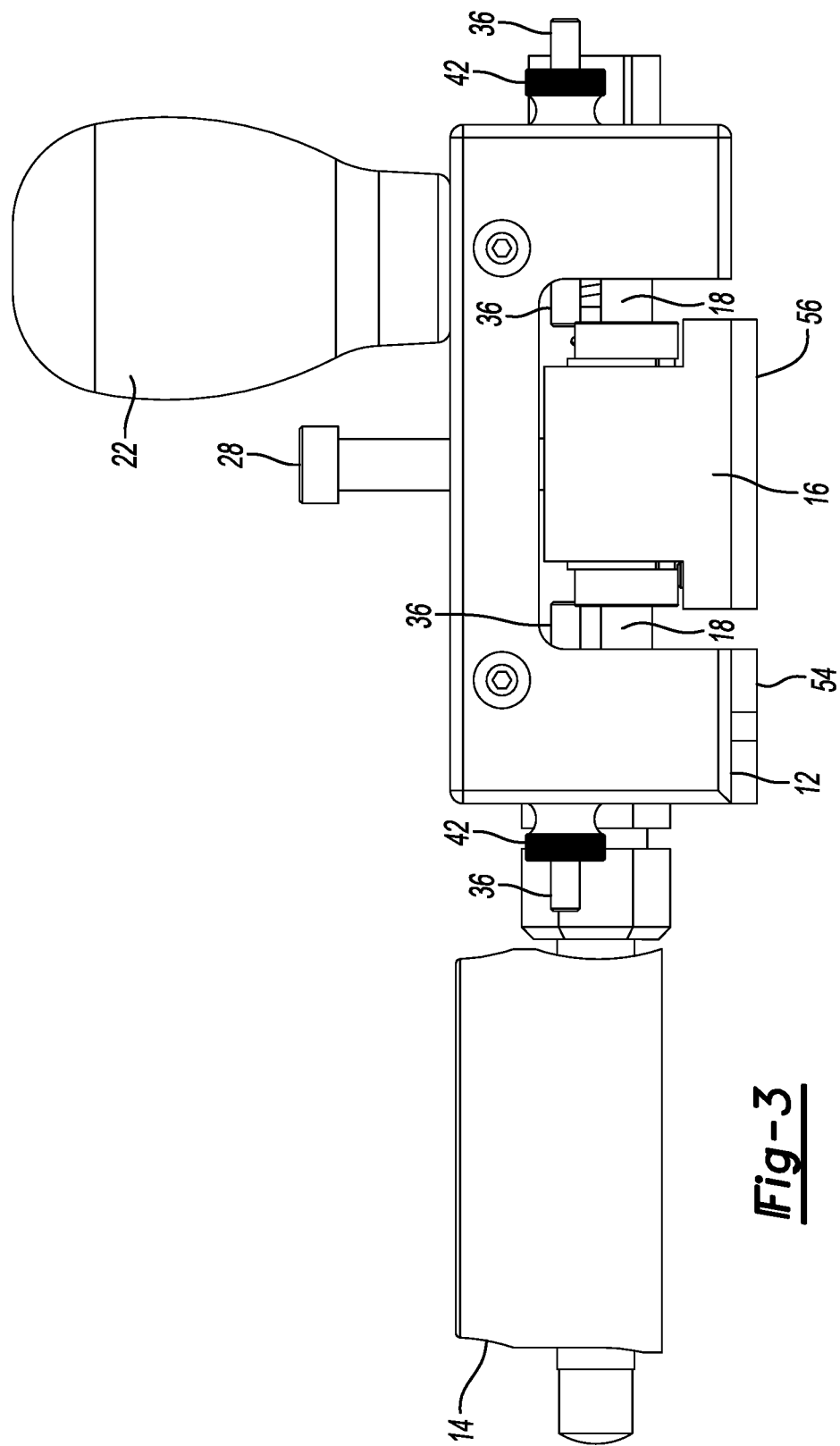
FIG. 3 is a plan view of the comparative measurement gauge according to the first aspect of this disclosure.

Referring to FIG. 3, a plan view of the gauge 10 is illustrated. Travel limit stops 36 are shown extending through both arms of the U-shaped body 12. If the travel limit stops 36 are not set to extend within the space between the two arms of the U-shaped body 12, the gauge may have a stroke of 10.5 mm. But a gauge for larger or smaller applications may have larger or smaller strokes. The stroke, or distance traveled by the slide, relates to a measured difference between the part being measured and a known 'master' sample. For most applications, a tolerance greater than 10.5 mm is rare. Thus, the stroke of 10.5 mm is suitable for most applications. The travel limit stops 36 are threaded fasteners that are set in place by thumb nuts 42. The thumb nuts 42 preferably have a knurled exterior surface for ease of adjustment. The travel limit stops 36 function as a stop to prevent over travel or under travel of the linear displacement gauge 14. It is preferable to set the limit stops 36 according to an estimated amount of variation of the part(s) being measured.

As one example, if a user is measuring the inner diameter of a gear, the user must ensure the measurement probes are in contact with the root of the gear at two points spread at 180° away from each other. If there is too much distance between the one of the measurement probes, the gear may improperly rotate and prevent taking an accurate measurement. This can be prevented by adjusting the travel limit stop 36. Over travel occurs when the measurement indicator extension and tip is displaced further than the permissible range for the given indicator. Repeated over travel can reduce the accuracy of the gauge.

The slide 16 includes a measurement probe mounting surface 56. The measurement probe mounting surfaces, 54 and 56, respectively are substantially in the same plane to provide an accurate measurement.

Figure 4:
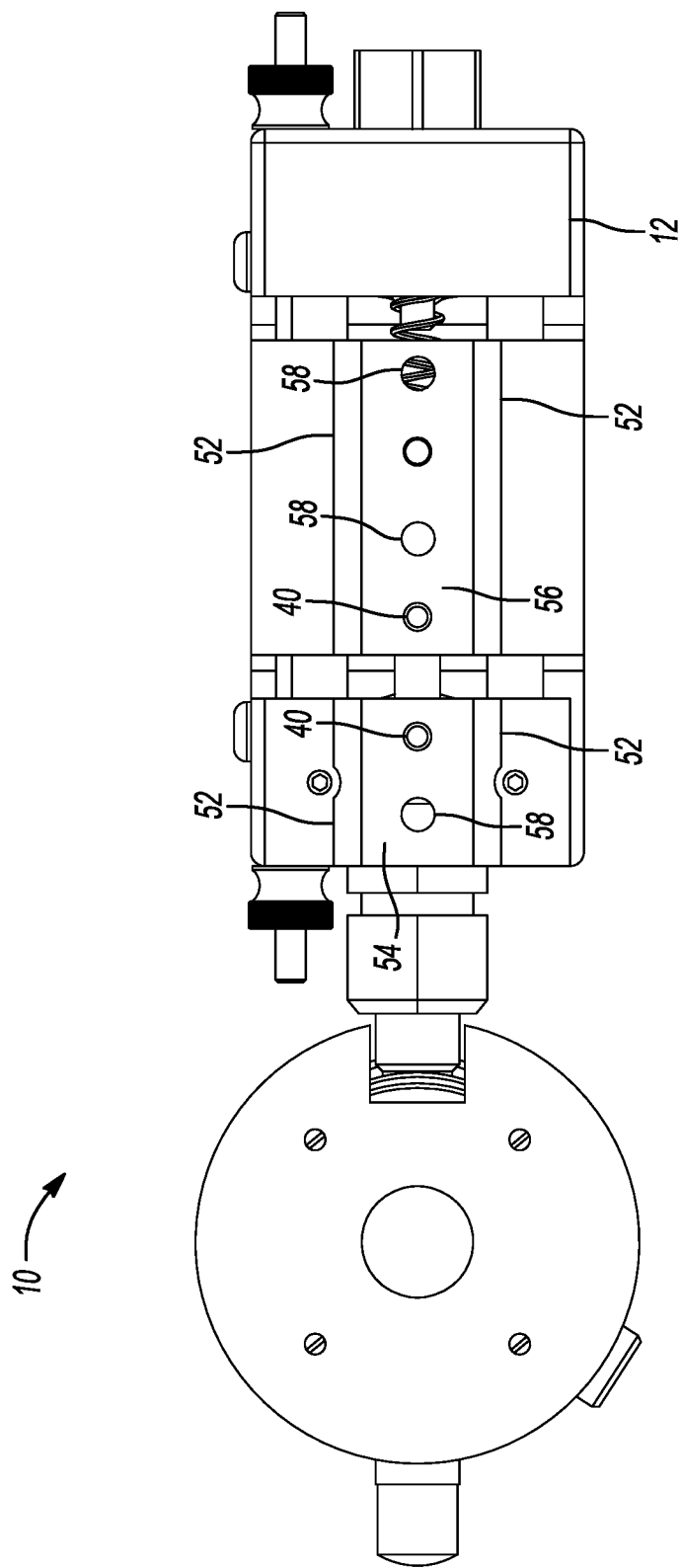
FIG. 4 is a bottom view of the comparative measurement gauge according to the first aspect of this disclosure.

Referring to FIG. 4, a bottom view of the gauge 10 is illustrated. The tooling alignment channel 52 extends along the bottom portion of the U-shaped body 12 and the slide 16. The tooling alignment channel 52 is defined by two downwardly projecting surfaces that serve as a transverse locating feature. Dowel pins 40 are shown within one of the arms of the U-shaped body 12 and the slide 16. The dowel pins 40 function as a longitudinal locator. Threaded holes 58 are defined by the mounting surface 54 in the U-shaped body 12 and the slide 16 for attaching measurement probes (not shown). The threaded holes 58 are used to attach various measurement probes to the U-shaped body 12 and the slide 16. The slide 16 includes two threaded holes 58. Two holes 58 may be used to accommodate larger measurement probes. More than two holes may be provided depending on the application and the length of the measurement probes. The various measurement probes employed will be described in further detail below.

Figure 5:
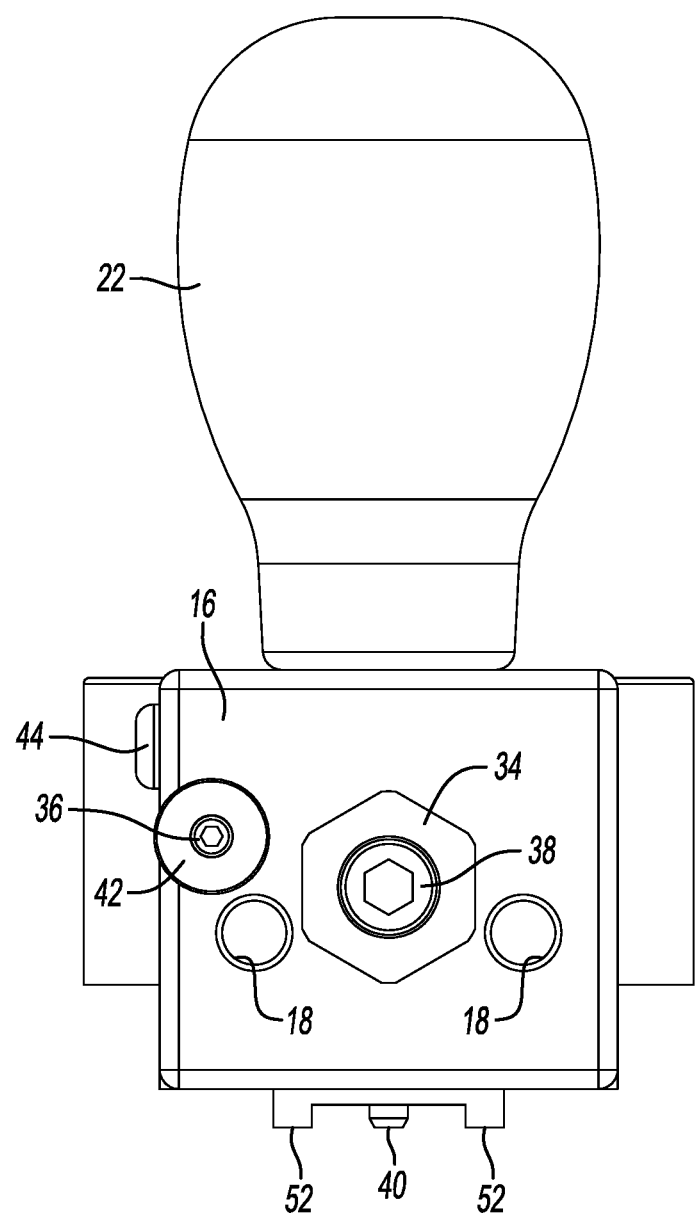
FIG. 5 is a front view of the comparative measurement gauge according to the first aspect of this disclosure.

Referring to FIG. 5, a front-end view of the gauge 10 is illustrated. A handle 22 is attached to the U-shaped body 12. Rods 18 are disposed within the U-shaped body 12 and extend throughout the length of the body. The use of two rods 18 is illustrated, but one rod or more than two rods may also be used. The rods 18 are press fit within the U-shaped body to minimize positional variance.

Referring to FIG. 6, an exploded view of the gauge 10 is illustrated. The linear displacement gauge 14 is shown surrounded by an indicator shroud 15. The U-shaped body 12 is shown below the trigger 28 and the handle screw 46. The trigger 28 may be a threaded fastener, as shown, that threads into the threaded hole 29 within the slide 16. The trigger 28 may take another form such as a stud, bracket or other elongated member that is attached to the slide. When assembled, the trigger 28 extends through and slides within the trigger slot 27. The handle screw 46 is an elongated member with a threaded portion being inserted within either of the threaded handle holes 102 within the U-shaped body 12. The handle 22 may include internal threads used to engage a threaded portion of the handle screw 46. Illustrated below the U-shaped body 12 is the slide 16, rods 18, bearings 20 and snap rings 21. The bearings 20 are disposed between the slide 16 and the rods 18 and are held in place by snap rings 21. The bearings 20 may be held within the slide 16 by other means including, but not limited to, a press fit arrangement, a fastener, and/or adhesive. The rods 18 are inserted and are located within the rod holes 19 within the U-shaped body 12. Dowel pins 40 are shown below the slide 16 and the U-shaped body 12 and, are attracted to the slide 16 and the first arm 8 of the U-shaped body 12. Spring 24 is shown in front of the spring adjustment fastener 38, and the stop sleeve 34. The spring 24, when assembled, sits on the shank or nests within a recessed portion of the spring adjustment fastener 38.

Referring to FIG. 7, the measurement gauge 10 and base assembly 310 are illustrated. The base assembly 310 includes a base 300 that is a planar member, that may be made of steel, aluminum or other material suitable to act as a stand. A base arm 302 extends outwardly from the base 300 and is attached by a locking arm 304 and locking arm fastener 305. The locking arm 304 is loosened to allow the base arm 302 to be pivoted to various angles to provide an ergonomic set up. The comparative measurement gauge 10 is attached to the base arm 302 by threading the handle screw 46 into the threaded attachment hole 102 (FIG. 6) on the U-shaped body 12. A computer 312 is illustrated and is shown as connected to the comparative measurement gauge 10. The connection may be a wireless connection or a hardwired connection. The measurement indicator may be a Mahr Federal® type 1086Ri electronic indicator with wireless data transfer to a software program, application or other medium that is advantageous for sorting or checking dimensional quality of parts with the capability of maintaining traceability. For instance, a RFID tag, bar code, QR code or other electronically recognized identifier may be associated with a part to be measured. A user may scan an identifier on a part to be measured, the identifier would then be recorded by the computer 312, a user would then measure the part, and the measurement correlated to the appropriate identifier. With this approach, parts requiring one hundred percent traceability can be checked.

Figure 8:
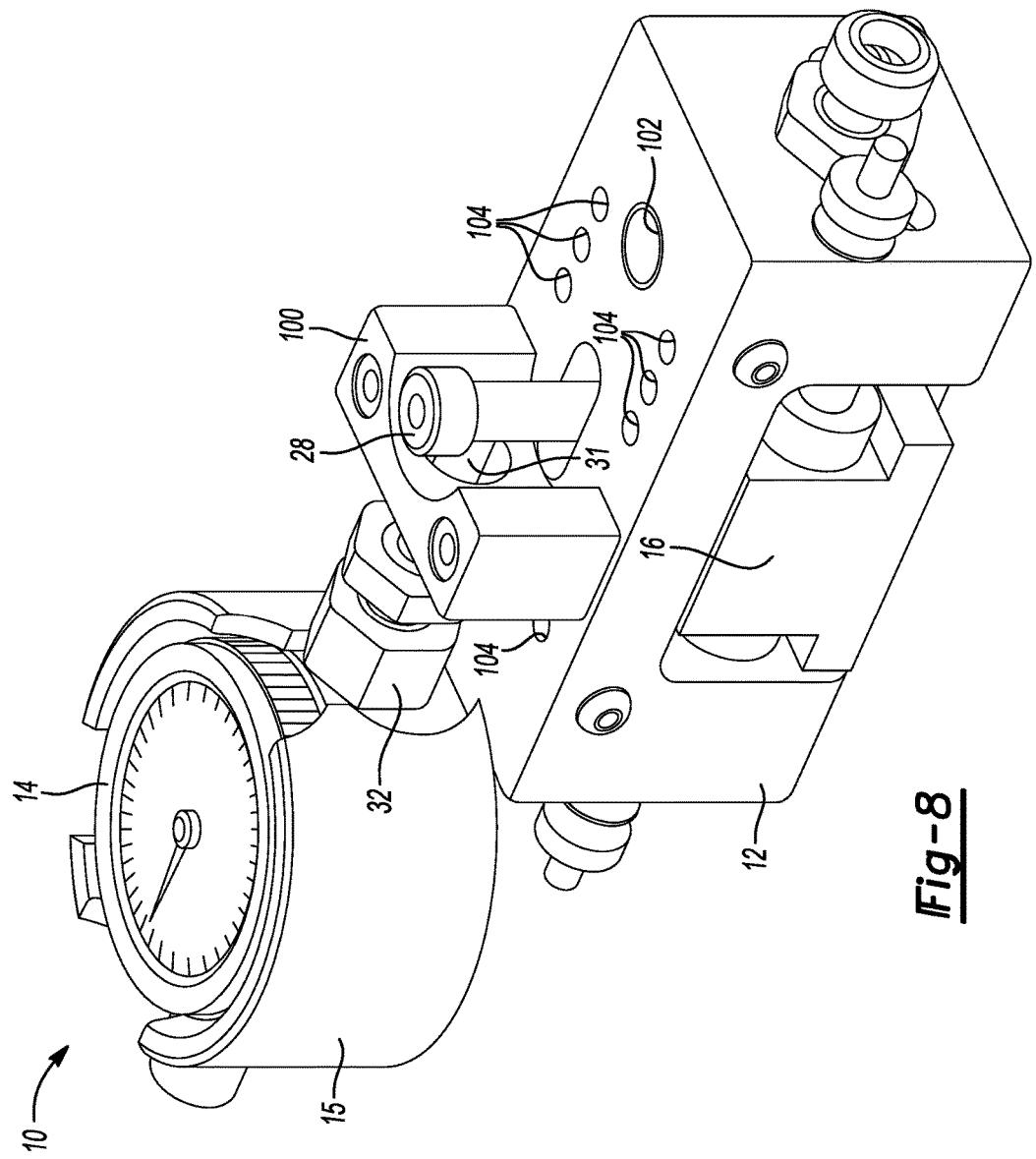
FIG. 8 is a perspective view of the comparative measurement gauge according to the second aspect of this disclosure.

Referring to FIG. 8, a second embodiment of the gauge 10 is illustrated. This configuration may be utilized when an operator places the gauge 10 on top of or hangs the gauge 10 on a part being measured. A bracket 100 is shown attached to the top portion of the U-shaped body 12 via set travel limit stops 36. The mounting bracket 100 may be attached to different sets of threaded holes 104 defined by the top of the U-shaped body 12 to provide varied stroke lengths or for parts requiring a larger or smaller displacement of the slide. The linear displacement gauge 14 is attached to the bracket 100. The indicator tip 31 and indicator tip extension 30 (FIG. 6) translates through a hole within the bracket 100 to position the indicator tip 31 to be adjacent to the trigger 28. The gauge 10 is operated by grasping or palming the body of the gauge and pulling the trigger 28 to move the trigger against the bias of the spring. After the gauge 10 is placed within or on the part being measured, the trigger is then released and the spring (FIG. 6) returns the slide 16 to measure the part. The above description of the measurement gauge described with reference to FIGS. 8 and 17 applies to the second embodiment of the measurement gauge as shown in FIG. 8.

Figure 9:
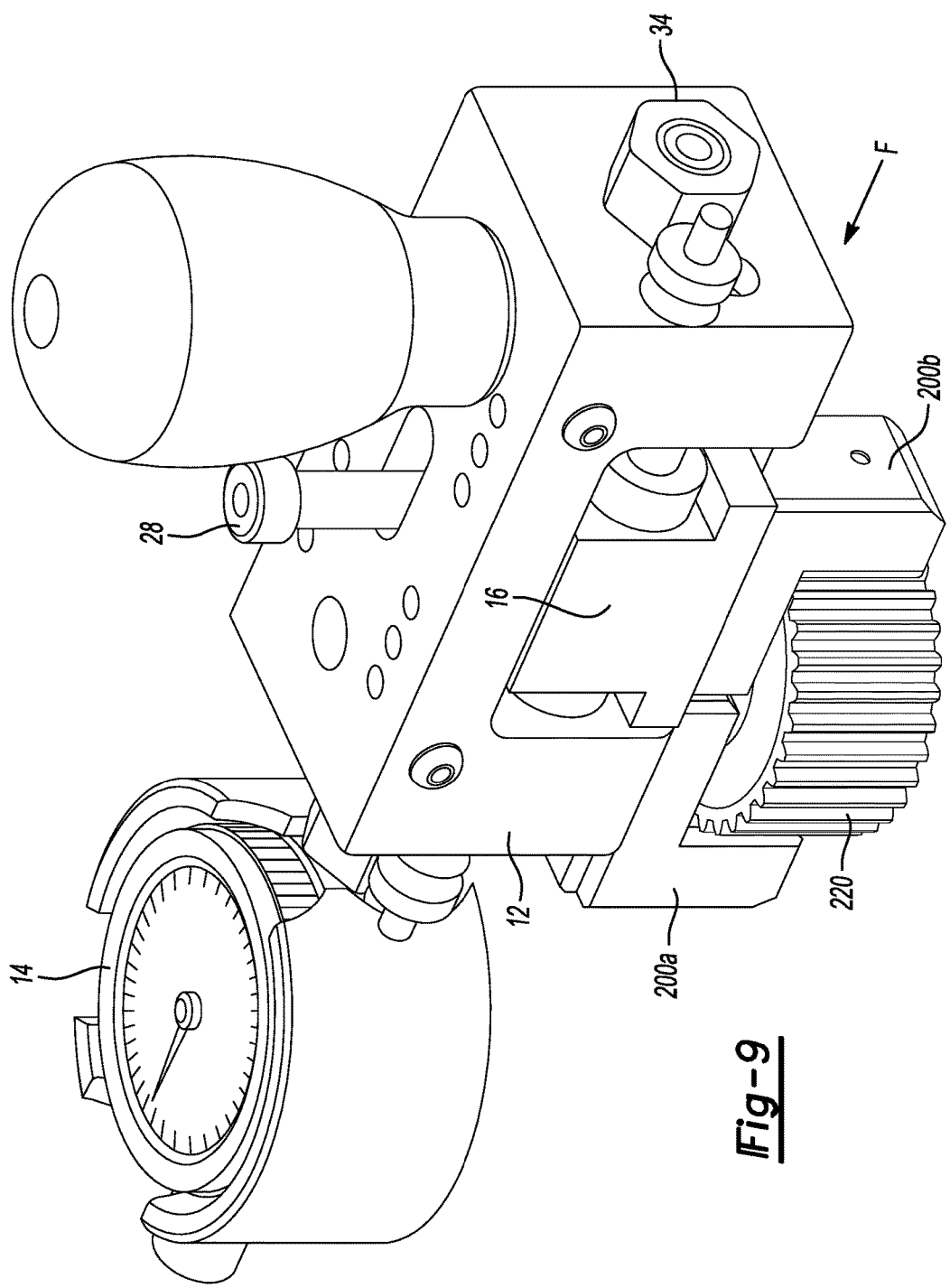
FIG. 9 is a perspective view of the comparative measurement gauge measuring an outer feature of a gear.

Referring to FIGS. 9 and 10, the comparative measuring gauge 10 is shown measuring a gear 220. Gear measurement probes 200 are shown attached to the U-shaped body 12 and the slide 16. More specifically, the gear measurement probes 200 include a fixed measurement probe 200a attached to the U-shaped body 12 and a movable measurement probe 200b to the slide 16. To engage the gear 220, the trigger 28 is moved away from the fixed measurement probe 200a to open the measurement probes to accommodate the gear 220. The trigger 28 is then released and the slide 16 and the measurement probe attached to the slide 16 are displaced towards the directional arrow F.

The gear measurement probes 200 include a threaded hole 206 used to attach the gear measurement probes 200 to the U-shaped body 12 and the slide 16. A locating slot 204 engages the dowel pin 40 (FIG. 4) to align the threaded hole 206 that is located near the threaded hole, the attachment hole 58 (FIG. 4) within the slide 16, and the U-shaped body 12. A concave surface 201 is defined by the downwardly extending portion of the measurement probe. The concave surface 201 engages the outer diameter of the gear 220. A circular recess 205 includes a protrusion 202 with a spherical ball 203. The protrusion 202 may have a frustoconical shape. The spherical ball 203 may engage either the root of the gear or portions between the teeth of the gear to measure the pitch diameter of the gear. The gear measurement probes 200 are capable of measuring a spur gear, a helical gear, a pinion or other gear having a rounded shape.

Figure 11:
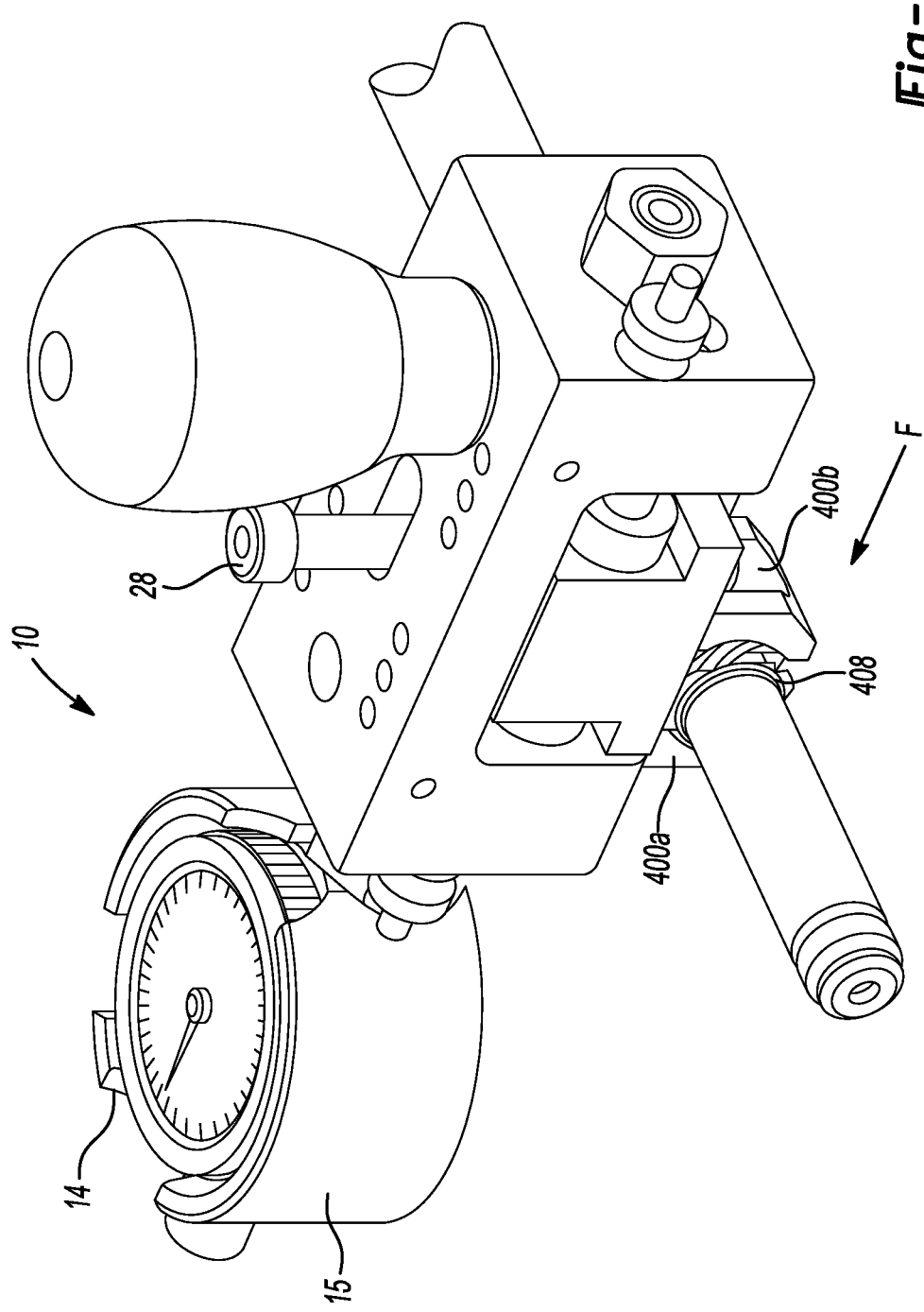
FIG. 11 is a perspective view of the comparative measurement gauge measuring a worm gear.

Referring to FIGS. 11 and 12, a comparative measurement gauge 10 is shown measuring a worm gear 408. Worm gear measurement probes 400 are shown. A fixed measurement probe 400a is attached to the U-shaped body 12 and a movable measurement probe 400b is attached to the slide 16. To engage the worm gear 408, the trigger 28 is moved away from the fixed measurement probe 400a to open the probes to accommodate the worm gear 408. The trigger 28 is then released and the slide 16 and the movable measurement probe 400b attached to the slide 16 is displaced along the directional arrow F. FIG. 11 is just one example of a part that is larger than the gauge 10 being measured is attached to a part that is larger than the measurement device. In this instance, because the worm gear 408 is attached to a rather large shaft, the gauge is brought to the part and placed on the worm gear. The spring 24 (FIG. 6) applies sufficient force to the slide to resist the weight of the gauge causing the gauge to fall off the part, a measurement may be taken.

Referring to FIG. 12, worm gear measurement probes 400 are illustrated. The worm gear measurement probe 400 includes an attachment hole 406. An alignment channel 404 is provided near the threaded attachment hole 406 that engages a dowel pin 40 (FIG. 6) to align the attachment hole 406 and the attachment hole 58 (FIG. 4) within the slide 16 and the U-shaped body 12. The concave surface 401 engages the outside diameter of the worm gear 408. The concave surface includes a spherical ball 402. The spherical ball 402 may engage either the root of the gear or the portion between the teeth of the gear that would measure the pitch diameter.

Referring to FIGS. 13-15, the gauge 10 is shown measuring an internal diameter or internal threads of a part 410. Internal measurement probes 412 engage the part to measure an internal diameter. Internal thread measurement probes 422 engage the part to measure an internal thread. Either or are attached to the U-shaped body 12 and the slide 16. To engage the internal diameter or internal threads of the part 410, the trigger 28 is moved towards the fixed measurement probe 412/422a to close the measurement probes to accommodate an internal thread or internal diameter of part 410. The trigger 28 is then released and the slide 16 and the movable measurement probe 412/422b attached to the slide 16 is displaced along the directional arrow F.

Referring to FIG. 14, internal diameter measurement probes 412 for an inner diameter of the part 410 are illustrated. The measurement probe 412 includes a threaded attachment hole 414. An alignment channel 416 near the threaded attachment hole 414 engages a dowel pin 40 to align the threaded attachment hole 414, the attachment hole within the slide 16, and the U-shaped body 12. A shank 427 extends away from the attachment hole 414 and alignment channel 416. The shank 427 includes a protrusion 418 that is configured to engage an internal diameter of the part 410. The measurement probes 412 provide a two-point contact within the internal diameter of the part 410.

Referring to FIG. 15, internal thread measurement probes 422 are illustrated. The measurement probe 422 includes a threaded attachment hole 424. An alignment channel 426 near the threaded attachment hole 424 engages a dowel pin 40 to align the threaded attachment hole 424 and the attachment hole 58 within the slide 16 and the U-shaped body 12. A shank 427 extends away from the attachment hole 414 and alignment channel 416. The shank 427 includes a thread engaging protrusion 428, shown in more detail in FIG. 15-A, that is configured to engage an internal diameter of the part 410. The measurement probes 422 provide a three-point contact within the internal diameter of the part 410. The protrusion 428 may take several other forms capable of engaging and measuring various parts including but not limited to an internal diameter of an O-ring, snap ring, snap ring groove, or a chamfer within a hole.

Figure 16:
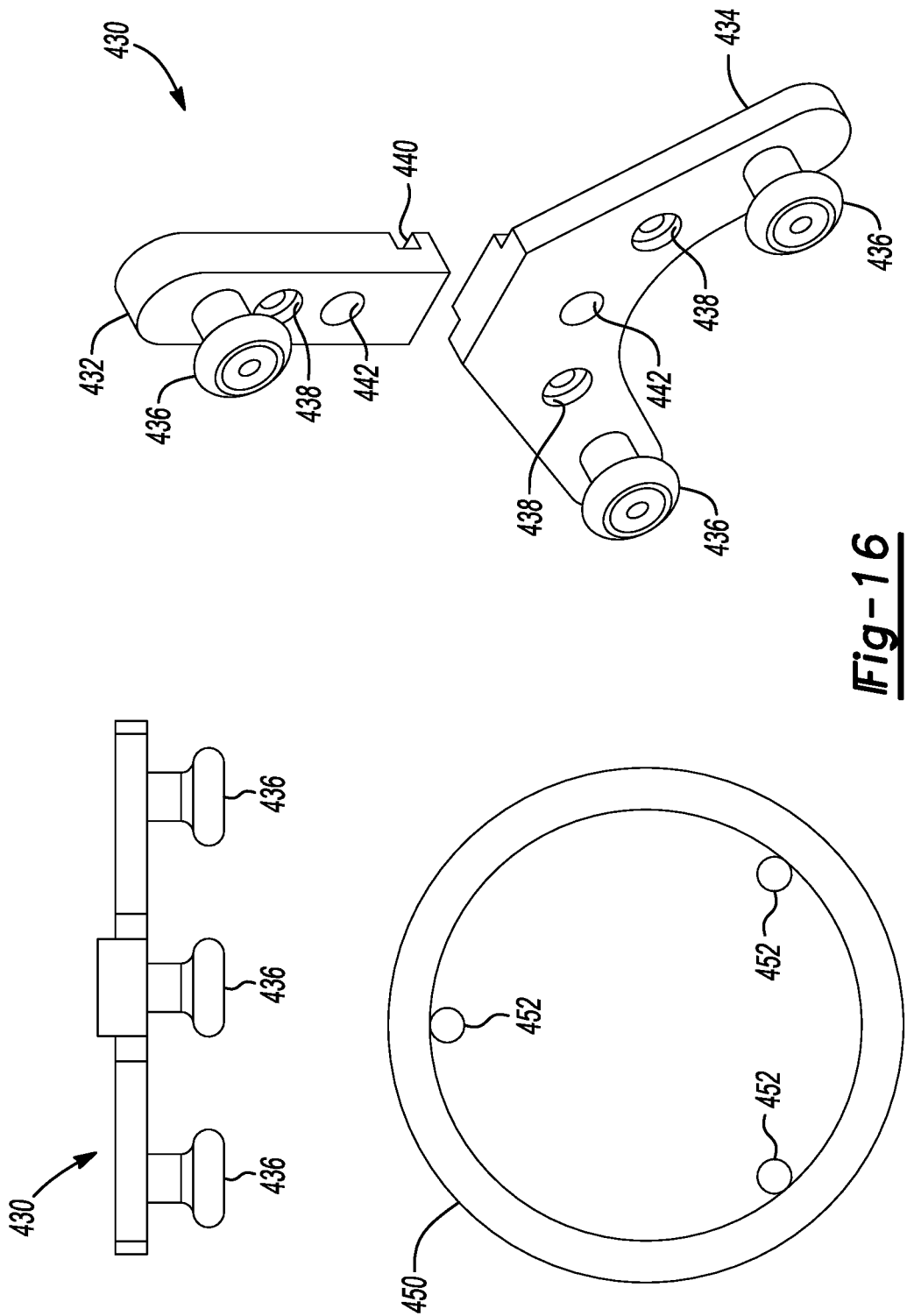
FIG. 16 is a perspective view of the measurement probes adapted to measure an inner diameter.

Referring to FIG. 16, large bore measurement probes 430 are illustrated for measuring a bore or a part with a larger internal diameter 450. The measurement probes 430 include a single leg 432 and a double leg 434. The single leg 432 and double leg 434 provide a measurement using three contact points 452 within the part 450. Feet 436 engage contact points 452 and are disposed near the distal end of each arm. The feet 436 are preferably attached by external threads that engage an internal thread at the attachment holes 438. Alignment holes 442 are provided within the double leg 434 and the single leg 432. The alignment holes 442 engage with a dowel pin 40 within the U-shaped body 12 and the slide 16. An alignment channel 440 is provided near the alignment holes 442.

Figure 17:
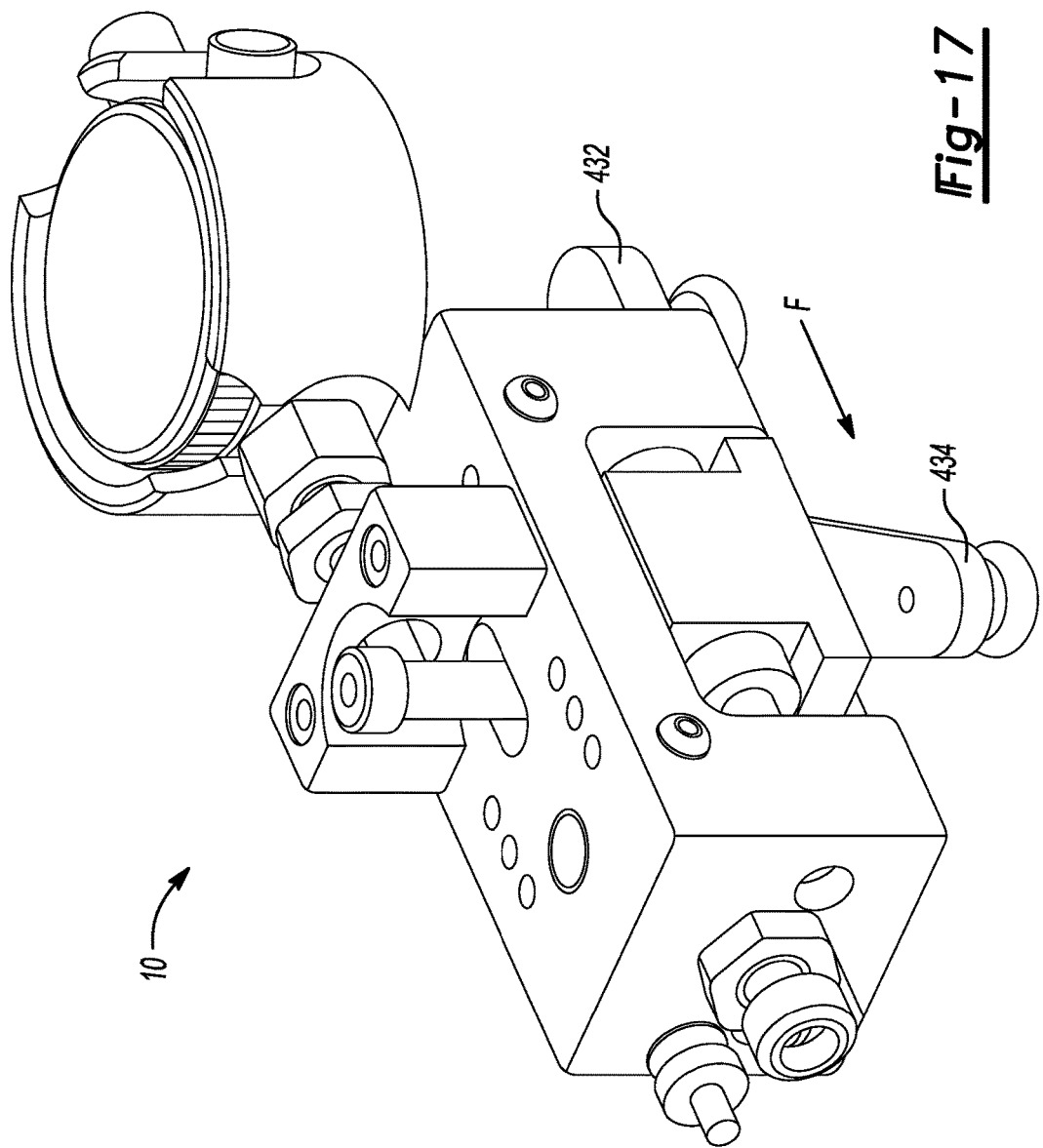
FIG. 17 is a perspective view of the comparative measurement gauge adapted to measure an inner diameter.

Referring to FIG. 17, the large bore measurement gauge 10 configured to measure an internal diameter with the large bore measurement probes 430 is illustrated. The single leg or fixed measurement probe 432 of the measurement probe 430 is fixed to the U-shaped body. The double leg 434 is attached to the slide and is configured to move relative to the single leg 432. The trigger 28 is pulled to move the slide towards the linear displacement gauge 14. The trigger 28 is then released to allow the slide and double leg or movable measurement probe 434 to move in the direction shown by arrow F. For example, if the part is larger than the gauge, the single and double legs may be made larger to accommodate the measurement of larger parts. The strength of the spring 24 (FIG. 6) may be varied to ensure that measurement probe 430 fully engages the inner diameter of a part.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A multi-function gauge comprising:
   a U-shaped body including first and second arms connected by an intermediate portion;
   a fixed measurement probe connected to one of the arms;
   a slide disposed between the two arms, the slide being supported on a guide rail for movement between the two arms;
   a movable measurement probe connected to the slide;
   a spring operatively engaging the slide to bias the slide in one direction relative to the fixed measurement probe; and
   a linear displacement gauge mechanically connected to the movable measurement probe to measure the distance between the fixed and movable measurement probes, wherein the linear displacement gauge is attached to the intermediate portion in a first mode and in a second mode the linear displacement gauge is attached to one of the arms and operatively engages the slide.

2. The multi-function gauge of claim 1 wherein in a third mode the linear displacement gauge is attached to the other arm and operatively engages the slide.

3. The multi-function gauge of claim 2 wherein the spring biases the slide towards the fixed measurement probe to measure an external feature of a part.

4. The multi-function gauge of claim 1 wherein the guide rail includes at least one rod disposed in a space defined between the first and second arms.

5. The gauge of claim 1 further comprising:
   a trigger attached to the slide, the trigger extending through the intermediate portion of the U-shaped body, wherein a force applied to the trigger moves the slide.

6. The gauge of claim 5 further comprising:
   a handle outwardly extending from the U-shaped body and spaced apart from the trigger so that a user may grasp the handle to hold the gauge and actuate the trigger with one hand.

7. The gauge of claim 5 wherein when the linear displacement gauge is connected to the intermediate portion of the U-shaped body a tip of the linear displacement gauge engages the trigger so that a user may grasp the U-shaped body, actuate the trigger, and position the gauge on a part.

8. The gauge of claim 7 further comprising:
a mounting bracket wherein the mounting bracket may be attached to the intermediate portion of the U-shaped body in either a first position or a second position to facilitate the orientation of the linear displacement gauge.

9. A gauge comprising:
a U-shaped body including first and second arms connected by an intermediate portion;
a fixed measurement probe connected to one of the arms;
a slide disposed between the two arms, the slide being supported on a guide rail for movement between the two arms;
a movable measurement probe connected to the slide;
a spring operatively engaging the slide to bias the slide in one direction relative to the fixed probe; and
a linear displacement gauge mechanically connected to the movable measurement probe to measure the distance between the fixed and movable measurement probes.

10. The gauge of claim 9 wherein each of the first and second arms are adapted to receive the linear displacement gauge, wherein the linear displacement gauge is attached to the first arm in a first mode and in a second mode the linear displacement gauge is attached to the second arm.

11. The gauge of claim 9 wherein each of the first and second arms define an aperture that receives the spring so that the spring may bias the slide either towards or away from the fixed measurement probe.

12. The gauge of claim 9 wherein the spring applies a clamp force on a part positioned between the movable measurement probe and the fixed measurement probe that is equal to or greater than the weight of the gauge so that the gauge may hang from the part.

13. The gauge of claim 12 further comprising:
a fastener coaxial with the spring and connected to one of the arms so that the fastener may be turned to compress or relax the spring to adjust the clamp force.

14. The gauge of claim 9 further comprising:
two fixed locators engaging an inner periphery defined by a part wherein, the spring applies a radial force to a movable locator within the inner periphery and wherein the two fixed locators and the movable locator locate the gauge within the inner periphery to provide a measurement between the three points.

15. The gauge of claim 9 further comprising:
a base member; and
a mounting arm having a proximal end and a distal end, wherein the proximal end is pivotally connected to the base member, wherein the U-shaped body may be mounted to the distal end of the mounting arm.

16. The multi-function gauge of claim 15 further comprising:
a spring seated on the first arm that engages the slide, wherein in the first mode the spring biases the slide towards the second arm to measure an internal feature of a part.

17. The multi-function gauge of claim 15 wherein the guide rail includes a first rod and a second rod disposed between the first and second arms and wherein the first and second rods are each equidistantly spaced away from a distal end of the first and second arms.

18. The multi-function gauge of claim 15 further comprising:
a general purpose computer configured to communicate with the linear displacement gauge to record the measurement.

19. A multi-function gauge comprising:
a U-shaped body including first and second arms connected by an intermediate portion, wherein at least one of the arms is adapted to receive a fixed measurement probe;
a slide disposed between the two arms, the slide being supported on a guide rail for movement between the two arms and adapted to receive a movable measurement probe; and
a linear displacement gauge detachably connected to the U-shaped body and mechanically connected to the slide, wherein the linear displacement gauge is attached to the intermediate portion in a first mode, wherein the linear displacement gauge includes a tip that engages an elongated trigger that extends from the slide through a slot defined by the intermediate portion, in a second mode the linear displacement gauge is attached to the first arm to operatively engage the slide as the slide moves in a first direction, and in a third mode the linear displacement gauge is attached to the second arm to operatively engage the slide as the slide moves in a second direction.

20. The multi-function gauge of claim 19 wherein in the third mode the spring biases the slide towards the fixed measurement probe to measure an external feature of a part.

* * * * *